(12) United States Patent
Applebaum et al.

(10) Patent No.: US 7,636,855 B2
(45) Date of Patent: Dec. 22, 2009

(54) MULTIPLE CHOICE CHALLENGE-RESPONSE USER AUTHORIZATION SYSTEM AND METHOD

(75) Inventors: Ted H. Applebaum, Santa Barbara, CA (US); Philippe Morin, Santa Barbara, CA (US)

(73) Assignee: Panasonic Corporation, Osaka (JP)

( * ) Notice: Subject to any disclaimer, the term of this patent is extended or adjusted under 35 U.S.C. 154(b) by 672 days.

(21) Appl. No.: 10/769,276

(22) Filed: Jan. 30, 2004

(65) Prior Publication Data

US 2005/0171851 A1    Aug. 4, 2005

(51) Int. Cl.
*G06F 21/00* (2006.01)

(52) U.S. Cl. .............................. 713/186; 726/4; 726/17

(58) Field of Classification Search ................. 713/186, 713/182; 726/2, 4, 17–19, 1, 5; 704/246, 704/251, 235, 200; 705/50, 67, 44, 18; 340/5.2, 340/5.21, 5.8, 5.81, 5.82, 5.84, 5.85; 382/115

See application file for complete search history.

(56) References Cited

U.S. PATENT DOCUMENTS

| | | | |
|---|---|---|---|
| 5,946,654 A * | 8/1999 | Newman et al. | 704/246 |
| 6,356,868 B1 * | 3/2002 | Yuschik et al. | 704/246 |
| 6,393,305 B1 * | 5/2002 | Ulvinen et al. | 455/563 |
| 6,424,946 B1 * | 7/2002 | Tritschler et al. | 704/272 |
| 6,490,560 B1 | 12/2002 | Ramaswamy et al. | |
| 6,519,563 B1 * | 2/2003 | Lee et al. | 704/246 |
| 6,529,871 B1 | 3/2003 | Kanevsky et al. | |
| 6,697,778 B1 * | 2/2004 | Kuhn et al. | 704/243 |
| 6,826,306 B1 * | 11/2004 | Lewis et al. | 382/187 |
| 7,085,718 B2 * | 8/2006 | Kemp | 704/244 |
| 2003/0046083 A1 * | 3/2003 | Devinney et al. | 704/273 |
| 2005/0039057 A1 * | 2/2005 | Bagga et al. | 713/202 |
| 2005/0060554 A1 * | 3/2005 | O'Donoghue | 713/183 |

FOREIGN PATENT DOCUMENTS

EP            444351 A2  *  9/1991

* cited by examiner

*Primary Examiner*—Kimyen Vu
*Assistant Examiner*—Nirav Patel
(74) *Attorney, Agent, or Firm*—Harness, Dickey & Pierce, PLC (57) ABSTRACT

A user authentication system includes a dialogue manager adapted to prompt the user with multiple, selectable pass-phrases. A selection recognizer recognizes user selection of at least one of the multiple, selectable pass-phrases. A user identity analysis module analyzes one or more potential user identities based on adherence of user selection of the pass-phrase to predetermined pass-phrase selection criteria assigned one or more enrolled users.

39 Claims, 2 Drawing Sheets

MULTIPLE CHOICE CHALLENGE-RESPONSE USER AUTHORIZATION SYSTEM AND METHOD

FIELD OF THE INVENTION

The present invention generally relates to medium to high security control of access to resources, and particularly relates to biometric authorization of users in a challenge/response system.

BACKGROUND OF THE INVENTION

Today's tasks of providing medium to high security control of access to a resource (such as entry to a facility or use of a service) increasingly employs biometric authentication of enrolled users. Authentication includes the cases of (1) verification, in which the user claims a specific identity and (2) identification, in which the user does not assert an identity, and where the system must hypothesize the user identity. Verification tasks typically have lower computational requirements and higher confidence due to their lower perplexity relative to the identification tasks.

Biometric authentication may be made more secure by challenge/response protocols. For example challenge/response protocols thwart replay attacks in which the bio-signature of the enrolled user is recorded and replayed to the system in a subsequent attempt to gain access. In challenge/response protocols the response required of the user depends on the challenge provided by the system. Text-independent speaker authentication biometrics are particularly well suited to challenge/response protocols, as unlimited variation of the speech responses may be made to the text-independent speaker verification system.

Typical user authentication systems prompt the user with one or more questions, each having a unique answer. For example: "Please say your password" or "what is your mother's maiden name". These answers may readily be compromised, when other persons may listen to or otherwise observe the session, especially in the case of speaker authentication. Thus, the need remains for a challenge/response user authentication system and method that more adequately thwarts an interloper seeking to anticipate appropriate responses. The present invention fulfills this need.

SUMMARY OF THE INVENTION

In accordance with the present invention, a user authentication system includes a dialogue manager adapted to prompt the user with multiple, selectable pass-phrases. A selection recognizer recognizes user selection of at least one of the multiple, selectable pass-phrases. A user identity analysis module analyzes one or more potential user identities based on adherence of user selection of the pass-phrase to predetermined pass-phrase selection criteria assigned one or more enrolled users.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
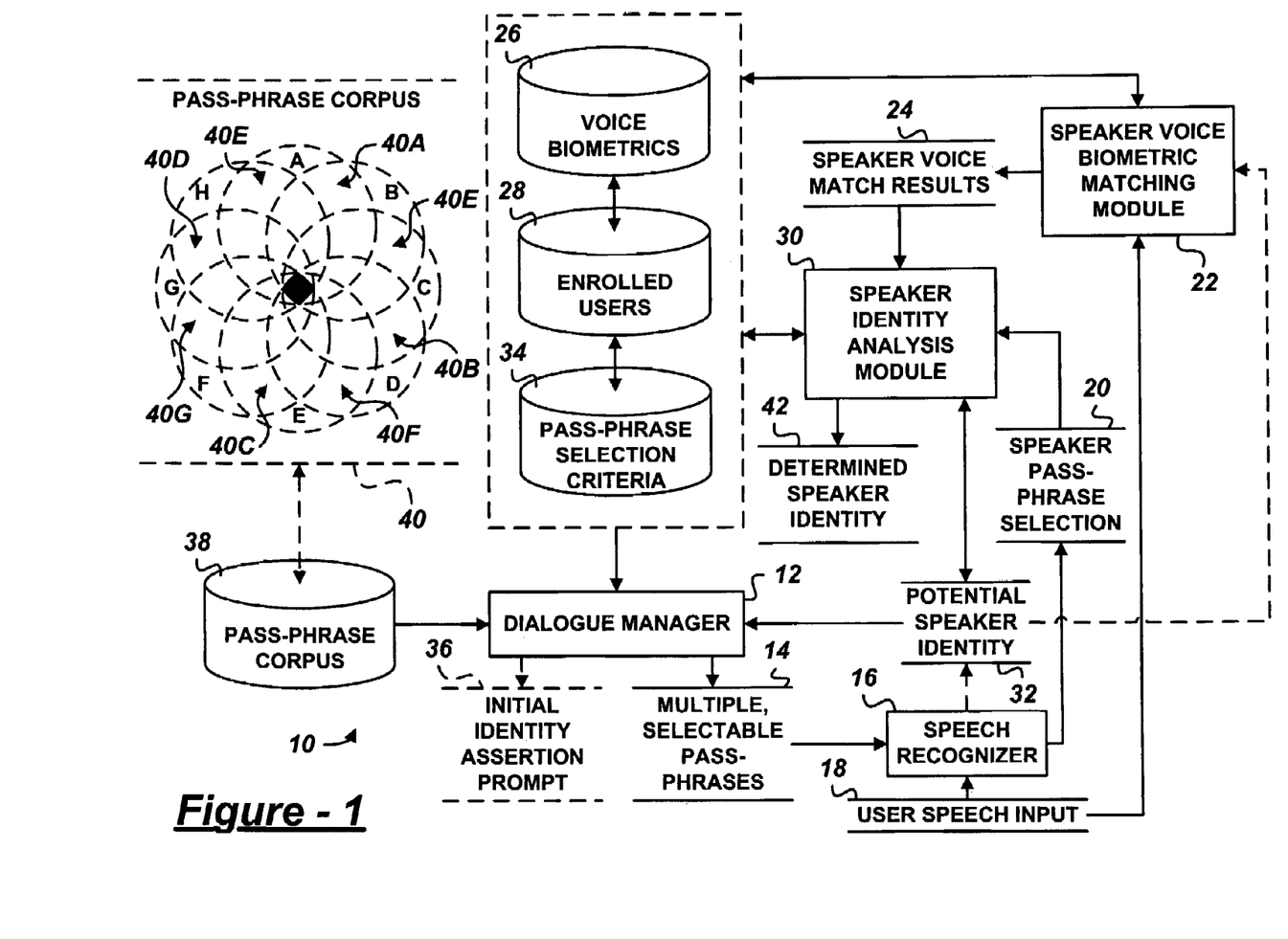
FIG. 1 is a block diagram illustrating a user authentication system according to the present invention.

By way of overview and with reference to FIG. 1, the present invention is a user authentication system 10. In some embodiments, the user authentication system further corresponds to a speaker authentication system. However, it should be readily understood that user input may be non-verbal in some embodiments, and that user biometrics may not be speech related. The system 10 includes a dialogue manager 12 adapted to prompt a user with multiple, selectable pass-phrases 14. A selection recognizer 16, such as a speech recognizer, receives a user selection input in the form of user input 18, such as user speech input, and recognizes user selection 20 of one or more pass-phrases based on the user selection input. A user biometric matching module 22, such as a voice biometric matching module, receives user biometric input, such as user speech input, and makes a match 24 based on user biometrics 26 of enrolled users 28. In some embodiments, the user input 18 is employed as both the user selection input and the user biometric input. A user identity analysis module 30 analyzes one or more potential user identities 32 based on the match 24 and adherence of user selection 20 of the pass-phrase to predetermined pass-phrase selection criteria 34 of enrolled users 28. Different enrolled users 28 are preferably assigned distinguishable pass-phrase selection criteria 34.

In some embodiments, the user authentication system 10 is a user verification system. Accordingly, dialogue manager 12 may be adapted to prompt the user for an initial identity assertion via initial identity assertion prompt 36. Thus, the dialogue manager may ask the user to speak the user's name, state a pass-phrase permanently assigned to the user, enter a PIN number, supply the user's social security number or employee number, provide the user's birthday, or otherwise present some type of identifying information. In such a case, the initial user response may provide a user input 18 that identifies a single potential speaker identity 32. Accordingly, subsequent dialogue turns may result in analysis of the single potential user identity, and the user input 18 providing the identity assertion may also be employed by user biometric matching module to obtain the match 24.

In some embodiments, the user authentication system 10 is a user identification system. Accordingly, dialogue manager may be adapted to inform the user about an appropriate activation cue, but this function is optional. For example, the activation cue may correspond to placement of a user's hand on a handprint biometric extraction module of an associated user interface. Thus, a number of pass-phrases may be displayed on the handprint extractor or a representation thereof to indicate a position in which the user should place the hand in order to select one or more pass-phrases. Accordingly, the activation cue may be employed as the user selection input and/or user biometric input. If suitable for user biometric input, the activation cue may be employed by biometric matching module 22 to make an initial assessment of potential speaker identity 32. In some embodiments, dialogue manager 12 may automatically display or otherwise communicate the selectable pass-phrases 14 for any user to select and thereby initiate the authorization process as described above. In other embodiments, the activation cue may result in dialogue manager 12 prompting the user with multiple, selectable pass-phrases 14.

Dialogue manager 12 may be adapted to select the multiple pass-phrases 14 more or less randomly from a pass-phrase corpus 38. As illustrated at 40, the pass-phrase corpus 38 may include many exclusive and non-exclusive classifications of pass-phrases with respect to which the selection criteria 34 may be defined. For example, classes of pass-phrases may include fruits, sporting activities, nouns, and verbs. Thus, some pass-phrases may belong to both the fruit class and the noun class, while others may belong to both the sporting activity class and the verb class. However, some nouns may not be fruits, while some verbs may not be sporting activities. Further, it may be that all fruits are nouns while all sporting activities are verbs. Yet further, nouns may generally not be verbs, while sporting activities may generally not be fruits. Thus, the pass-phrase corpus 38 may be arranged in an ontological fashion, with super-classes and sub-classes clearly delineated.

In practice, corpus 38 may be composed of a lexicon of pass-phrases, with each phrase tagged by metadata indicating the classes to which the phrase belongs. Methods may also be employed to test pass-phrases as needed to determine whether they exhibit certain characteristics that cause them to belong to a related class. Thus, a method may test a pass-phrase to determine if it contains a particular letter that may be passed to the method as one of the arguments. Also, the pass-phrases may be organized into an ontological structure. Further, a hierarchical classification map may be referenced by dialogue manager 12 with respect to metadata tagging the pass-phrases. The optional ontological structure of the pass-phrase corpus 38 is illustrated at 40 in the form of a Venn diagram.

It is envisioned that dialogue manager 12 may be adapted to recursively prompt users with multiple pass-phrases 14 in a strategic fashion. For example, where many selection criteria 34 exist with respect to many potential user identities 32, it follows that many classifications of pass-phrases may need to be accommodated in the prompt containing the multiple, selectable pass-phrases 14. Dialogue manager 12 may thus employ an assembly strategy that randomly assembles multiple pass-phrases 14 from different portions of the pass-phrase corpus 38 in a focused manner.

It is also envisioned that the focused assembly strategy may ensure that the selections are distinguishable while still accommodating all classes relevant to the potential speaker identities 32. For example, if dialogue manager 12 is adapted to assemble four pass-phrases per prompt, then it may randomly assemble a first pass-phrase from region 40A, a second pass-phrase from region 40B, a third pass-phrase from region 40C, and a fourth pass-phrases from region 40D. This selection strategy includes all of classes A-H, while ensuring that no two pass-phrases in the prompt belong to the same class. In a subsequent recursion, dialogue manager 12 may vary the focusing strategy to further differentiate between potential speaker identities and obfuscate which types of rule selection criteria 34 are available. The new strategy may be based on a new, narrower definition of the potential speaker identities 20, such that it may not be necessary to accommodate all classes, even in the case of user identification. Thus, a wider range of pass-phrases becomes available for assembly as the number of potential user identities diminishes. However, even where all classes still need to be accommodated, dialogue manager can still vary the assembly strategy on a subsequent dialogue turn, for example, by assembling pass-phrases from regions 40E-40H.

It is further envisioned that the assembly strategy may vary to accommodate different selection criterion analysis techniques. For example, the assembly may not attempt to ensure that no two pass-phrases in the prompt share the same class, especially in the case where a user is expected to select all pass-phrases in the prompt that meet the selection criterion. In fact, the assembly strategy may intentionally ensure that more than one pass-phrase in the prompt shares the same class. Alternative selection strategies focusing on different regions and groups of regions will become readily apparent to those skilled in the art in view of the preceding and subsequent disclosure.

It is still further envisioned that the selection criteria may relate to pass-phrase classes as described above in terms of pre-determined pass-phrase characteristics. It is further envisioned, however, that one or more selection criteria can be based on correlation of pass-phrase characteristics within the prompt, communication characteristics of pass-phrases within the prompt, and other types of selection criteria. Thus, a selection criterion may correspond to pass phrases having a relationship of alphabetical order or numerical value with respect to other pass-phrases in a prompt. For example, an authorized user may be assigned a rule to always select a word in the prompt that would be the first phrase listed if the pass-phrases in the prompt were rearranged in alphabetical order. Also, a selection criterion may relate to selection of pass-phrases located in a specific position in a prompt. For example, an authorized user may be assigned a rule to always select the third pass-phrase listed in each prompt.

It is yet still further envisioned that an authorized user may be assigned a sequence of selection criteria for use with a single prompt or recursive prompts. For example, a user may be assigned a rule set to select the third pass-phrase during a first dialogue turn, the first pass-phrase in a second dialogue turn, and so forth. Likewise, an authorized user may be assigned a rule set to select a noun in a first dialogue turn, a number closest to zero in a second dialogue turn, and the last pass-phrase in the prompt in a third dialogue turn. Similarly, an authorized user may be assigned a rule set to select several or even all pass-phrases in a single prompt in accordance with a sequential rule set, such as a predetermined sequence.

It is even further envisioned that some embodiments of the present invention may present the user with a prompt that resembles a numeric keypad. The numeric keys may retain their positional significance to the user, but display randomly assembled pass-phrases for the user to speak instead of the usual numbers. Similarly, the keypad may display numerals that are randomly rearranged in each dialogue turn. In this case, the user may speak the numeric pass-phrases in accordance with a standard pattern based on keypad positions that match a PIN number assigned to the user. As a result, the set of pass-phrases thus spoken is highly likely to be different from dialogue turn to dialogue turn. Thus, an interloper attempting to record a user's voice and reproduce it later is likely to be thwarted. Moreover, the system can maintain a record of prompt assemblies and intentionally avoid using the same prompt twice as part of the prompt selection strategy, especially with respect to a single potential user as with speaker verification.

It is yet even further envisioned that some embodiments of the present invention employing the numeric keypad prompt may be implemented on a user's computer or website to thwart attempts to record and transmit keystrokes to obtain a pass phrase. For example, a program that surreptitiously records a user's keystrokes can obtain the user's pass-phrase if the user's keystrokes are always the same. If the computer or website prompts the user as described above, however, then the user is likely to enter different keystrokes each time the pass-phrase is entered. The underlying access control system may in this case be adapted to equate the new pass-phrase with the user's permanently assigned pass-phrase based on the prompt, such that the permanently assigned pass-phrase constitutes the pass-phrase selection criteria. Alternatively, an interface on the user's computer may remember the user's permanently assigned pass-phrase for accessing, for example, a particular website, and perform a translation for the user as appropriate to ensure that the varying keystrokes result in the proper pass-phrase being sent to the website. It is significant that biometric identification is not necessary in these cases to achieve the desired result. It is further significant that these embodiments may have only one enrolled user. It is envisioned that many embodiments of the present invention may not employ biometric identification, and/or may not have more than one enrolled user.

In embodiments that do combine biometric identification with pass-phrase selection criteria, user identity analysis module 30 is able to determine the speaker identity 42 by combining the match results 24 with user adherence to pass-phrase selection criteria. In some embodiments, system 10 may be adapted to output the determined user identity 42. In other embodiments, system 10 may be adapted to generate a signal indicating whether the user is an authorized user 28. It is envisioned that system 10 may be adapted to enroll new users 28 by receiving or capturing a user biometric and storing the biometric in memory. Further, dialogue manager may be adapted to randomly select one or more pass-phrase selection criteria 34 and assign them to the user. Alternatively or additionally, dialogue manager 12 may be adapted to allow the user to specify some or all of the strictures of the one or more criteria assigned to the user as further explained below.

According to some embodiments, the present invention is a multiple choice pass-phrase user authorization system, such that determination of the user identity is made available, for instance to control the user's access to a resource, such as a product, service, or facility. Accordingly, each enrolled user has a secret rule by which he or she may find the correct pass-phrase(s) in each multiple selection prompt. As explained above, the technique may be used for user verification (where the suspect person claims an identity which the system verifies) or user identification (where the person does not explicitly claim an identity, but the system determines the identity.)

In operation, the system presents the suspect person with a list of "pass-phrases". The person responds, preferably via biometrically verifiable production, to a subset of the pass-phrases which match a secret criterion associated with the enrolled user. The secret criterion should be easy for the enrolled user to remember, but difficult to guess by observing the user's behavior. Examples are (a) pass-phrases containing a given letter, (b) pass-phrases phrases which rhyme with a given word, (c) pass-phrases selected from a list suggested by the user at the time of the enrollment, (d) pass-phrases matching a semantic criterion, (e) pass-phrases containing double letters, and (f) pass-phrases immediately following the pass-phrase which matches one of the preceding criterion. More complex criteria may also be formed by combining simple criteria with Boolean operators such as "and", "or" and "not". For example a complex selection criterion could be "pass-phrases containing the letter 's' or the letter 'n' but not designating a fruit".

For example, in the case of user verification via a speaker authentication biometric, a person wanting access to a secure building may approach a display terminal and microphone at the entry door. The person may say his or her name as a means of claiming identity. The system may then recognize the name and display on the terminal a list of pass-phrases. The person may speak only those pass-phrases that contain the letter "D" (the secret criterion registered with the claimed identity). The system estimates a knowledge verification score reflecting the confidence that the correct pass-phrases where selected, and a speaker verification score which reflects the confidence that the speaker's voice characteristics match the enrolled user's voice model. For each spoken response from the user, the system computes both of these verification scores in a preferred embodiment. The user verification score is a combination of the knowledge verification score and the speaker verification score.

The steps of the invention for user verification are: (a) receiving an identity claim of the user; (b) prompting the user with multiple pass-phrases; (c) receiving from the user a selection of a sub-set of the prompted pass-phrases, at least one of the identity claim and the selection being received as a biometrically verifiable production of the user; (d) evaluating correctness of the selection from the user with respect to a selection criterion associated with the claimed identity; (e) performing biometric verification of the at least one of the identity claim and the selection which is received as the biometrically verifiable production; and (f) authorizing the user if steps (d) and (e) indicate such authorization to be warranted.

The steps of the invention for user identification are: (a) receiving an activation cue from the user; (b) prompting the user with multiple pass-phrases; (c) receiving from the user a selection of a sub-set of the prompted pass-phrases, at least one of the activation cue and the selection being received as a biometrically identifiable production of the user; (d) performing biometric identification of at least one of the activation cue and the selection which is received as the biometrically identifiable production; (e) evaluating correctness of the selection from the user with respect to a selection criterion associated with at least one potential speaker identity; and (f) authorizing the user if steps (d) and (e) indicate such authorization to be warranted.

For further security, steps (b) through (e) may be repeated. Repetition of these steps makes it possible for the further security to be obtained in the case where, for one of the sets of multiple pass-phrases, the user deliberately selects the "wrong" prompt. An interloper observing the interaction will not know which of the sets of responses is the "wrong" one. This obfuscation makes the task of guessing the selection criterion much more difficult for an interloper.

Enrollment in the procedure requires registration of the biometric model, and registration of a criterion for the prompt selection task. Registration of the biometric model is known in the art. Registration of the criterion for the prompt selection task can be done in various ways, such as the system assigning a random criterion to the enrolling user, or the enrolling user selecting a criterion from a list. For example the system may ask the user to choose one of these criterion categories: A. pass-phrases containing a given letter, B. pass-phrases which rhyme with a given word, C. pass-phrases selected from a list, D. pass-phrases matching a semantic criterion, E. pass-phrases containing double letters, F. pass-phrases immediately following the pass-phrase which matches one of the preceding criteria. In this example, the enrolling user responds "A" (meaning: "pass-phrases containing a given letter"). The system prompts for the criterion letter. The enrolling user responds "Y". In this case the selection criterion becomes: "pass-phrases that contain the letter "Y".

In addition to the preferred embodiment of biometric authentication via speaker authentication, other biometric modalities such as fingerprint may be used. In the case of fingerprint biometrics, using different fingers to indicate different positions of the pass-phrase in the prompt list may effect the authentication selection. For example, pass-phrases may be displayed in relation to each finger of a handprint capture mechanism. In some related embodiments, the user may select the correct pass-phrase by inserting fingers into all of the fingerprint capture regions except the one related to the proper pass-phrase. Another possible biometric for authentication is gesture recognition. In this case, user-selected gestures may be used to select the pass-phrase.

Table 1 below illustrates an example of user identification with three enrolled users (Alice, Betty and Carla) each having their own knowledge rule (second column) and speaker verification model (not shown). The first round prompt of pass-phrases ("Apple—Cow—Egg—Goat") elicits a spoken response ("Apple"), which matches the knowledge rules of the first and third enrolled users. Illustrative numerical scores are shown in the columns under "First Prompt". At the end of the first round of prompts the model for the third enrolled user (Carla) has the highest score (the sum of 5 based on successfully matching the knowledge score and 6 from the speech characteristics). If a higher degree of confidence is needed, a second or more rounds may be required. Next, the second round prompt of pass-phrases ("Basket—Dog—Fig—Hat") elicits a spoken response ("Fig"), which matches only Carla's knowledge model. In the example, the test is concluded when a threshold score of twenty is exceeded. The applicant is identified as the user model exceeding this threshold score (e.g. Carla).

TABLE 1

Example of User Identification with three enrolled users and an acceptance threshold of +20.

| | | First Prompt | | Second Prompt | |
|---|---|---|---|---|---|
| | | Pass Phrases | | | |
| | | Apple-Cow-Egg-Goat | | Basket-Dog-Fig-Hat | |
| | | Response | | | |
| | | Apple | | Fig | |
| Enrolled User | Knowledge Rule | Knowledge Score | SV Score | Knowledge Score | SV Score |
| | | Incremental Score | | | |
| Alice | Word starting with "A" | +5 | −6 | −5 | −5 |
| Betty | Second word in series | −5 | −9 | −5 | −3 |
| Carla | Word is a Fruit | +5 | +6 | +5 | +7 |
| | | Cumulative Score | | | |
| Alice | | 0 + (5 − 6) = −1 | | −1 + (−5−5) = −11 | |
| Betty | | 0 + (−5−9) = −14 | | −14 + (−5 −3) = −22 | |
| Carla | | 0 + (5 + 6) = +11 | | +11 + (5 + 7) = +23 | |

In embodiments that perform speaker verification, the use of text-independent speaker verification is preferred to text-dependent speaker verification in embodiments that accomplish speaker authentication. In text-dependent speaker verification, the text prompts are limited to a finite list of registered productions. In text-independent speaker verification, the text prompts may be generated at random from anything in the language (e.g. English).

Further robustness of the biometric user authorization system against attacks by an imposter ensues by using concealed prompts, masked prompts or timing constraints, either independently or in combination with the above multiple prompting technique. Concealed prompts reduce the likelihood that an observer can determine how to respond to the system. Visual concealed prompts (e.g. text, icons, pictures, etc.) may be presented on a display screen having narrow angular range of visibility, as some liquid crystal display (LCD) screens, or by putting a tunnel-like shielding hood around the display. Auditory concealed prompts may be implemented by having the user put on headphones, or step into a soundproof enclosure. Tactile concealed prompts may be implemented by having the user place a hand on a hand-shaped pattern, where each finger may be stimulated independently.

Masked prompts are prompts that are embedded among other distracting prompts. For example, the masked prompt may be the illumination of a red light embedded in a 3-by-3 matrix of flashing colored lights. The neighboring lights distract the observer from the true prompt. An observer may notice the user responding when a light illuminates, but if more than one light has recently turned on he will not know which one was the true prompt cue.

Timing constraints may be added by requiring the user's response to come in a temporal relationship to the prompt, such as approximately two seconds after any prompt, or at the time that a particular prompt occurs. Timing constraints make it more difficult for an observing interloper to determine how to mimic the user. Timing constraints may require some practice to perform successfully and also increase the cognitive load on the user by distracting the user's attention from the simultaneous task of choosing the correct response. These factors further favor the habitual user and make it more difficult for an imposter to exactly duplicate the behavior of the registered user.

Passwords or pass-phrases which are used repeatedly are easy to enroll and easy to remember, but may be stolen by an observer. Furthermore, spoken pass-phrases which are used repeatedly are open to a replay attack, where the speaker's voice is recorded and replayed at a later time. If the rule used to select the pass-phrase is believed to be compromised, a new rule may be selected. It is not necessary to re-train the biometric verification portion of the user's model. Multi-prompt pass-phrase user authorization systems are robust against imposters observing and reproducing the responses of a legitimate user. Even if an imposter observes the prompts and responses, the rule to select the pass-phrase will be difficult to guess.

As overall user authentication scoring depends on a combination of selection of the correct pass-phrase and the user's biometric score (e.g. speakers voice characteristics) there is added robustness to failure of either mode. A trade-off of reliability between the two scores may be made. For example, a user may be validated even if the user forgets the rule for selecting pass-phrases (selection filter) but still passes the speaker voice characteristics test, or if the speaker's voice characteristics confidence score is low (e.g. because the speaker has a cold) but the person passes multiple trials of the prompt selection task.

Figure 2:
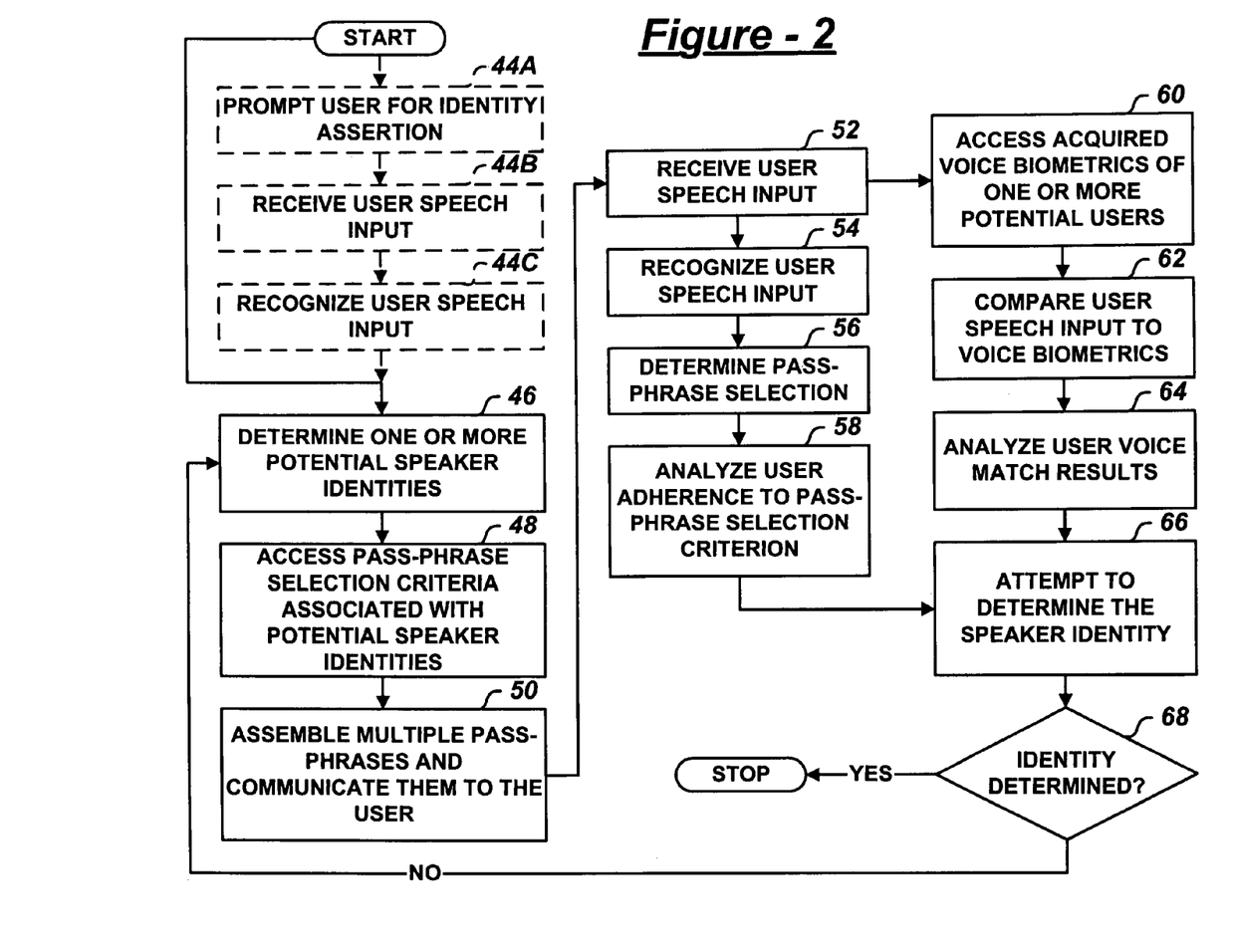
FIG. 2 is a flow diagram illustrating a user authentication method according to the present invention.

The method of user authentication according to the present invention is illustrated in FIG. 2. The method may start with steps 44A-C, which accomplish the initial steps of a speaker verification process. Accordingly, the method may begin with prompting the user for an identity assertion at step 44A, receiving user input as speech or in some other form at step 44B, and recognizing the user speech or other input at step 44C to determine the potential speaker identity at step 46. Alternatively, the method may begin in response to an activation cue, in which case the method includes assuming that the speaker may be any of the enrolled users at step 46. Then, pass-phrase selection criteria associated with the potential speaker identities is accessed at step 48. Multiple pass-phrases are next assembled based on the potential speaker identities and the selection criteria associated with those identities, and the assembled pass-phrases are communicated to the user at step 50. In cases where at least some criteria assigned to potential speakers relate to pass-phrase characteristics, an assembly strategy ensures that each relevant characteristic is represented in the assembled pass-phrases. Depending on the analysis technique, the assembly strategy may also ensure that no two pass-phrases share one or more of the relevant characteristics.

User input is received at step 52 that indicates selection of one or more pass-phrases. The input is recognized at step 54 to determine the pass phrase selection at step 56, and user adherence to pass phrase selection criteria of potential user identities is analyzed at step 58. User biometrics are accessed at step 60 and compared to a received user biometric at step 62. The user biometrics may be received at step 44B and/or step 52 if either of the related inputs is biometrically identifiable. Alternatively, the user biometric may be captured in a separate step. The biometric match results are analyzed at step 64 and combined with analysis of user adherence to pass-phrase selection criteria at step 66 in an attempt to determine the user identity. Cumulative results acquired over multiple dialogue turns may be employed, as may a scoring threshold as described above. If the identity is determined at 68, then the method ends with output of the determined identity or a decision that the user is known. Otherwise, processing returns to step 46, where the set of potential speaker identities may be modified.

The description of the invention is merely exemplary in nature and, thus, variations that do not depart from the gist of the invention are intended to be within the scope of the invention. For example, the input indicating the user selection may not be biometrically identifiable, and an identity assertion, activation cue, or passively collected image of the user or other biometric input technique may be employed. Those skilled in the art will readily recognize the advantages provided by the changing multiple choice pass-phrase prompt when combined with distinguishable selection criteria registered to enrolled users. Accordingly, those skilled in the art will implement these features of the present invention in various forms. Such variations are not to be regarded as a departure from the spirit and scope of the invention.

What is claimed is:

1. A user authentication system, comprising:
    a dialogue manager, executed on a processor of the user authentication system, adapted to prompt a user with multiple pass-phrases and requests the user to select a proper subset from the prompted multiple pass-phrase during authentication; wherein the prompted multiple pass-phrases are formed by selecting one or more pass-phrases from a set of pass-phrases satisfying a rule associated with the user and selecting one or more pass-phrases that do not satisfy the rule associated with user, wherein the rule associated with the user is determined prior to authentication and is not suggested to the user during authentication;
    a selection recognizer, executed on the processor of the user authentication system, adapted to recognize user selection of a proper subset of the prompted multiple pass-phrases;
    a user input adapted to capture a user biometric from the user selection;
    a biometric matching module, executed on the processor of the user authentication system, adapted to perform a biometric match between the user biometric and at least one biometric model associated with a potential user identity, wherein said user identity analysis module is adapted to analyze the potential user identity based on the biometric match between the user biometric and the at least one biometric model; and
    a user identity analysis module, executed on the processor of the user authentication system, adapted to analyze at least one potential user identity based on whether the pass-phrases in the proper subset of user selection each satisfy the rule associated with the user, wherein said dialogue manager is adapted to recursively prompt the user with new sets of multiple, selectable pass-phrases randomly assembled from a pass-phrase corpus over multiple dialogue turns, and said user identity analysis module is adapted to combine selection results and biometric match results from each dialogue turn to yield dialogue turn results and combine the dialogue turn results from each dialogue turn to form a cumulative result and authorize the user when the cumulative result exceeds a threshold.

2. The system of claim 1, wherein said selection recognizer is adapted to recognize a sequence of selections of multiple pass-phrases from the user; and said user identity analysis module is adapted to evaluate correctness of said sequence of selections from the user with respect to a sequence of changing selection criteria associated with the potential user identity.

3. The system of claim 1, wherein said dialogue manager is adapted to employ a pass-phrase selection strategy that constrains assembly by random selection of each pass-phrase in the prompt to ensure that selection criteria assigned to each of plural potential user identities are accommodated in the prompt in a distinguishable fashion complementing a user identity analysis technique of said user identity analysis module.

4. A user authentication system, comprising:
    a dialogue manager, executed on a processor of the user authentication system, adapted to prompt a user with multiple pass-phrases and requests the user to select a proper subset from the prompted multiple pass-phrases during authentication, wherein the prompted multiple pass-phrases are formed by selecting one or more pass-phrases from a set of pass-phrases satisfying a rule associated with the user and selecting one or more pass-phrases that do not satisfy the rule associated with the user, where the rule associated with the user is determined prior to authentication and is not suggested to the user during authentication;
    a selection recognizer, executed on the processor of the user authentication system, receptive of at least one user selection input and adapted to recognize user selection of a proper subset of the prompted pass-phrases based on the user selection input;
    a user biometric matching module, executed on the processor of the user authentication system, receptive of a user biometric input and adapted to make a match based on biometrics of enrolled users; and a user identity analysis module, executed on the processor of the user authentication system, adapted to analyze at least one potential user identity based on the match between the pass-phrases in the proper subset and the rule associated with the user, wherein said dialogue manager is adapted to recursively prompt the user with new sets of multiple, selectable pass-phrases randomly assembled from a pass-phrase corpus over multiple dialogue turns, and said user identity analysis module is adapted to combine selection results and biometric match results from each dialogue turn to yield dialogue turn results and combine the dialogue turn results from each dialogue turn to form a cumulative result and authorize the user when the cumulative result exceeds a threshold.

5. The system of claim 4, wherein said dialogue manager is adapted to assemble the multiple, selectable pass-phrases by random selection of pass-phrases from a pass-phrase corpus.

6. The system of claim 4, wherein said user identity analysis module is adapted to determine a user identity based on cumulative results of multiple dialogue turns, and said dialogue manager is adapted to recursively: (a) assemble new pass-phrases in a prompt presenting the multiple, selectable pass-phrases to the user during a single dialogue turn; and (b) prompt the user until the user identity is determined.

7. The system of claim 4, wherein said user identity analysis module is adapted to confirm the user identity based on non-adherence of user selection of the pass-phrase to predetermined pass-phrase selection criteria assigned to the user on at least one of a previous dialogue turn or a subsequent dialogue turn.

8. The system of claim 4, wherein said user identity analysis module is adapted to analyze the user identity based on adherence to a sequence of selection criteria, wherein enrolled users are assigned multiple selection criteria constrained to sequential use.

9. The system of claim 4, wherein said dialogue manager is adapted to employ a pass-phrase selection strategy that applies constraints to assembly of the multiple, selectable pass-phrases in a prompt presenting the multiple, selectable pass-phrases to the user during a single dialogue turn by applying the constraints to random selection of each pass-phrase in the prompt to ensure that the selection criteria assigned to each potential user identity are accommodated in the prompt in a distinguishable fashion complementing an analysis technique of said user identity analysis module.

10. The system of claim 4, further comprising a user interface at least one of adapted to conceal the prompt from non-users, adapted to mask the prompt by embedding the prompt among other, distracting prompts, or adapted to employ timing constraints restricting availability of an input function of the interface based on temporal relation to the prompt.

11. The system of claim 4, further comprising a datastore of the selection criteria, wherein the selection criteria are pre-defined to constrain password selection by at least one of pre-determined pass-phrase characteristics, correlation of pass-phrase characteristics within the prompt, or communication characteristics of pass-phrases within the prompt.

12. The system of claim 4, wherein said dialogue manager is adapted to enroll a user by assigning a selection criterion from at least one of the following categories:
   (a) pass-phrases containing a given letter;
   (b) pass-phrases which rhyme with a given word;
   (c) pass-phrases selected from a list;
   (d) pass-phrases matching a semantic criterion;
   (e) pass-phrases containing double letters;
   (f) pass-phrases located in a specific position in a prompt;
   (g) pass-phrases having a relationship of at least one of alphabetical order or numerical value with respect to other pass-phrases in a prompt;
   (h) pass-phrases belonging to a specific class according to a pass-phrase ontology;
   (i) pass-phrases immediately following a pass-phrase matching one of the preceding criteria; or
   (j) combinations of the above criteria.

13. The system of claim 4, wherein said dialogue manager is adapted to permit the user to specify at least one of:
   (a) a letter that must be contained in a selected pass-phrase in accordance with a selection criterion assigned to the user;
   (b) a word with which a selected pass-phrase must rhyme in accordance with a selection criterion assigned to the user;
   (c) a specific position within a prompt in which a selected pass-phrase must be located in accordance with a selection criterion assigned to the user;
   (d) a relationship of at least one of alphabetical order or numerical value with respect to other pass-phrases in a prompt that a selected pass-phrase must exhibit in accordance with a selection criterion assigned to the user; or
   (e) a specific class to which a selected pass-phrase must belong in a pass-phrase ontology in accordance with a selection criterion assigned to the user.

14. A method of user verification for use with a secure access control system, comprising the steps of:
   (a) receiving an identity claim of the user;
   (b) prompting, by a processor of the secure access control system, the user to select a subset of pass-phrases from multiple pass-phrases which are formed by selecting one or more pass-phrases from a set of pass-phrases satisfying a rule associated with the user and selecting one or more pass-phrases from a set of pass-phrases that do not satisfy the rule, where the rule associated with the user is determined prior to authentication and is not suggested to the user during authentication;
   (c) receiving from the user a selection of a sub-set of the prompted pass-phrases, where said selection being received as a biometrically verifiable production of the user;
   (d) evaluating, by the processor of the secure access control system, correctness of said selection from the user with respect to the rule associated with the user;
   (e) performing, by the processor of the secure access control system, biometric verification of said selection which is received as said biometrically verifiable production to yield biometric verification result;
   (f) recursively prompting, by the processor of the secure access control system, the user with new sets of multiple pass-phrases randomly assembled from a pass-phrase corpus over multiple dialogue turns;
   (g) combining, by the processor of the secure access control system, selection results and biometric verification results from each dialogue turn to yield dialogue turn results;
   (h) combining, by the processor of the secure access control system, the dialogue turn results over the multiple dialogue turns to form a cumulative result and authorizing the user when the cumulative result exceeds a threshold.

15. The method of claim 14, further comprising:
repeating steps (b) through (e); and
imposing a condition that the user must perform prompt selection in contradiction of the selection criteria during at least one repetition of steps (b) through (e).

16. The method of claim 14, further comprising:
receiving a sequence of selections of multiple prompts from the user; and
evaluating correctness of said sequence of selections from the user with respect to a sequence of selection criteria associated with the claimed identity.

17. The method of claim 14, further comprising evaluating correctness of said selection from the user with respect to a selection criterion from at least one of the following categories:
 (a) pass-phrases containing a given letter;
 (b) pass-phrases which rhyme with a given word;
 (c) pass-phrases selected from a list;
 (d) pass-phrases matching a semantic criterion;
 (e) pass-phrases containing double letters;
 (f) pass-phrases located in a specific position in a prompt;
 (g) pass-phrases having a relationship of at least one of alphabetical order or numerical value with respect to other pass-phrases in a prompt;
 (h) pass-phrases belonging to a specific class according to a pass-phrase ontology;
 (i) pass-phrases immediately following a pass-phrase matching one of the preceding criteria; or
 (j) combinations of the above criteria.

18. The method of claim 14, further comprising at least one of concealing the prompt from non-users, masking the prompt by embedding the prompt among other, distracting prompts, or employing timing constraints restricting performance of step (c) based on temporal relation to performance of step (b).

19. A method of user identification for use with a secure access control system, comprising the steps of:
 (a) receiving an activation cue from the user;
 (b) prompting, by a processor of the secure access control system, the user to select a subset of pass-phrases from multiple pass-phrases which are formed by selecting one or more pass-phrases from a set of pass-phrases satisfying a rule associated with the user and selecting one or more pass-phrases from a set of pass-phrases that do not satisfy the rule, where the rule associated with the user is determined prior to authentication and is not suggested to the user during authentication;
 (c) receiving from the user a selection of a sub-set of the prompted pass-phrases, at least one of said activation cue or said selection being received as a biometrically identifiable production of the user;
 (d) performing, by the processor of the secure access control system, biometric identification of at least one of said activation cue or said selection which is received as said biometrically identifiable production to yield biometric identification result;
 (e) evaluating, by the processor of the secure access control system, correctness of said selection from the user with respect to the rule associated with the user;
 (f) recursively prompting, by the processor of the secure access control system, the user with new sets of multiple pass-phrases randomly assembled from a pass-phrase corpus over multiple dialogue turns;
 (g) combining, by the processor of the secure access control system, selection result and biometric identification results from each dialogue turn to yield dialogue turn results;
 (h) combining, by the processor of the secure access control system, the dialogue turn results over the multiple dialogue turns to form a cumulative result and authorizing the user when the cumulative result exceeds a threshold.

20. The method of claim 19, further comprising:
repeating steps (b) through (e); and
imposing a condition that the user must perform prompt selection in contradiction of the selection criterion during at least one repetition of steps (b) through (e).

21. The method of claim 19, further comprising:
receiving a sequence of selections of multiple pass-phrases from the user; and
evaluating correctness of said sequence of selections from the user with respect to a sequence of selection criteria associated with the potential user identity.

22. The method of claim 19, further comprising evaluating correctness of said selection from the user with respect to a selection criterion from at least one of the following categories:
 (a) pass-phrases containing a given letter;
 (b) pass-phrases which rhyme with a given word;
 (c) pass-phrases selected from a list;
 (d) pass-phrases matching a semantic criterion;
 (e) pass-phrases containing double letters;
 (f) pass-phrases located in a specific position in a prompt;
 (g) pass-phrases having a relationship of at least one of alphabetical order or numerical value with respect to other pass-phrases in a prompt;
 (h) pass-phrases belonging to a specific class according to a pass-phrase ontology;
 (i) pass-phrases immediately following a pass-phrase matching one of the preceding criteria; or
 (j) combinations of the above criteria.

23. The method of claim 19, further comprising at least one of concealing the prompt from non-users, masking the prompt by embedding the prompt among other, distracting prompts, or employing timing constraints restricting performance of step (c) based on temporal relation to performance of step (b).

24. A user authentication method, comprising:
prompting, by a processor of a secure access control system, a user with multiple, selectable pass-phrases which are formed by selecting one or more pass-phrases from a set of pass-phrases satisfying a rule associated with the user and selecting one or more pass-phrases from a set of pass-phrases that do not satisfy the rule, where the rule associated with the user is determined prior to authentication and is not suggested to the user during authentication;
receiving at least one user selection input and recognizing user selection of at least one of the pass-phrases based on the user selection input;
making, by the processor of the secure access control system, a match based on biometrics of enrolled users and a user biometric input to yield biometric match result;
analyzing, by the processor of the secure access control system, at least one potential user identity based on the match between the pass-phrases in the user selection and the rule associated with the user;
recursively prompting, by the processor of the secure access control system, the user with new sets of multiple, selectable pass-phrases randomly assembled from a pass-phrase corpus over multiple dialogue turns;
combining, by the processor of the secure access control system, the biometric match results with the selection results from each dialogue turn to yield dialogue turn results;
combining, by the processor of the secure access control system, the dialogue turn results over the multiple dialogue turns to form a cumulative result and authorizing the user when the cumulative result exceeds a threshold.

25. The method of claim 24, further comprising assembling the multiple, selectable pass-phrases by random selection of pass-phrases from a pass-phrase corpus.

26. The method of claim 24, further comprising:
determining a user identity based on cumulative results of multiple dialogue turns;
recursively assembling new pass-phrases; and
prompting the user until the user identity is determined.

27. The method of claim 24, further comprising confirming the user identity based on non-adherence of user selection of the pass-phrase to predetermined pass-phrase selection criteria assigned to the user on at least one of a previous dialogue turn or a subsequent dialogue turn.

28. The method of claim 24, further comprising analyzing the user identity based on adherence to a sequence of selection criteria, wherein enrolled users are assigned multiple selection criteria constrained to sequential use.

29. The method of claim 24, further comprising employing a pass-phrase selection strategy that constrains assembly by random selection of each pass-phrase in the prompt to ensure that selection criteria assigned to each potential user identity are accommodated in the prompt in a distinguishable fashion complementing a user identity analysis.

30. The method of claim 24, further comprising at least one of:
concealing the prompt from non-users;
masking the prompt by embedding the prompt among other, distracting prompts; or
employing timing constraints restricting availability of an input function of an interface based on temporal relation to the prompt.

31. The method of claim 24, further comprising accessing a datastore of selection criteria, wherein the selection criteria relate to at least one of pre-determined pass-phrase characteristics, correlation of pass-phrase characteristics within the prompt, or communication characteristics of pass-phrases within the prompt.

32. The method of claim 24, further comprising enrolling a user by assigning a selection criterion from at least one of the following categories:
(a) pass-phrases containing a given letter;
(b) pass-phrases which rhyme with a given word;
(c) pass-phrases selected from a list;
(d) pass-phrases matching a semantic criterion;
(e) pass-phrases containing double letters;
(f) pass-phrases located in a specific position in a prompt;
(g) pass-phrases having a relationship of at least one of alphabetical order or numerical value with respect to other pass-phrases in a prompt;
(h) pass-phrases belonging to a specific class according to a pass-phrase ontology;
(i) pass-phrases immediately following a pass-phrase matching one of the preceding criteria; or
(j) combinations of the above criteria.

33. The method of claim 32, further comprising permitting the user to specify at least one of:
(a) a letter that must be contained in a selected pass-phrase in accordance with a selection criterion assigned to the user;
(b) a word with which a selected pass-phrase must rhyme in accordance with a selection criterion assigned to the user;
(c) a specific position within a prompt in which a selected pass-phrase must be located in accordance with a selection criterion assigned to the user;
(d) a relationship of at least one of alphabetical order or numerical value with respect to other pass-phrases in a prompt that a selected pass-phrase must exhibit in accordance with a selection criterion assigned to the user; or
(e) a specific class to which a selected pass-phrase must belong in a pass-phrase ontology in accordance with a selection criterion assigned to the user.

34. A user authentication method, comprising:
prompting, by a processor of a secure access control system, the user with multiple, selectable pass-phrases which are formed by selecting one or more pass-phrases from a set of pass-phrases satisfying a rule associated with the user and selecting one or more pass-phrases from a set of pass-phrases that do not satisfy the rule, where the rule associated with the user is determined prior to authentication and is not suggested to the user during authentication;
recognizing, by the processor of the secure access control system, user selection of at least one of the multiple, selectable pass-phrases;
analyzing, by the processor of the secure access control system, at least one potential user identity based on adherence of user selection of the pass-phrase to the rule associated with the user
capturing a user biometric from the user selection;
performing, by the processor of the secure access control system, a biometric match between the user biometric and at least one biometric model associated with the potential user identity; and
analyzing, by the processor of the secure access control system, the potential user identity based on the biometric match between the user biometric and the at least one biometric model,
recursively prompting the user with new sets of multiple, selectable pass-phrases randomly assembled from a pass-phrase corpus over multiple dialogue turns;
combining, by the processor of the secure access control system, the biometric match result with selection results from each to yield dialogue turn results;
combining, by the processor of the secure access control system, the dialogue turn results over the multiple dialogue turns to form a cumulative result and authorizing the user when the cumulative result exceeds a threshold.

35. The method of claim 34, further comprising:
recognizing a sequence of selections of multiple pass-phrases from the user; and
evaluating correctness of said sequence of selections from the user with respect to a sequence of changing selection criteria associated with the potential user identity.

36. The method of claim 34, further comprising employing a pass-phrase selection strategy that constrains assembly by random selection of each pass-phrase in the prompt to ensure that selection criteria assigned to each of plural potential user identities are accommodated in the prompt in a distinguishable fashion complementing a user identity analysis technique.

37. The system of claim 1, wherein the pass-phrase selection criteria are predefined by sub-classes of a pass-phrase corpus that is entirely predefined and pre-classified before the enrollment of the user.

38. The system of claim 37, wherein selection by the user of a presented pass-phrase belonging to a sub-class of the corpus constitutes adherence of user selection to a pass-phrase selection criterion for selecting pass-phrases belonging to that sub-class.

39. The system of claim 1 wherein the rule defines a selection criteria of a given pass-phrase in accordance with a relationship of the given pass-phrase to the prompted multiple pass-phrases.

* * * * *